(12) United States Patent
Gordon, III et al.

(10) Patent No.: US 7,030,202 B2
(45) Date of Patent: Apr. 18, 2006

(54) GRAFT COPOLYMERS AND METHOD TO PREPARE SAME

(75) Inventors: Bernard Gordon, III, Tucson, AZ (US); Jim DiBattista, Tucson, AZ (US)

(73) Assignee: Polymer Chemistry Innovations, Inc., Tucson, AZ (US)

( * ) Notice: Subject to any disclaimer, the term of this patent is extended or adjusted under 35 U.S.C. 154(b) by 77 days.

(21) Appl. No.: 10/603,564

(22) Filed: Jun. 25, 2003

(65) Prior Publication Data

US 2004/0092708 A1    May 13, 2004

Related U.S. Application Data

(60) Provisional application No. 60/391,479, filed on Jun. 25, 2002.

(51) Int. Cl.
*C08F 120/54* (2006.01)
*C08F 20/52* (2006.01)
*C08F 222/38* (2006.01)

(52) U.S. Cl. .............................. 526/303.1; 526/307.4; 526/316; 526/348; 526/263; 526/266

(58) Field of Classification Search ............... 526/348, 526/307.5, 303.1, 219.5, 227, 307.4, 316, 526/263, 266; 525/383
See application file for complete search history.

(56) References Cited

U.S. PATENT DOCUMENTS 4,709,039 A * 11/1987 Chou ........................... 548/237
5,063,262 A * 11/1991 Hildebrand .................. 524/97

OTHER PUBLICATIONS

George Odian, "Principles of polymerization", third edition, p. 20, (1991).*

* cited by examiner

*Primary Examiner*—Ling-Sui Choi
(74) *Attorney, Agent, or Firm*—Dale F. Regelman

(57) ABSTRACT

A thermally processable graft copolymer formed from a water soluble polymer and a water insoluble polymer, wherein the graft copolymer forms a hydrogel upon exposure to water. A method to form such a hydrogel-forming graft copolymer by copolymerizing a water soluble 2-substituted-2-oxazolines with a water insoluble 2-substituted-2-oxazoline. A method to form such a hydrogel-forming graft copolymer by transamidating a poly-2-oxazoline with a carboxylic acid terminated water-insoluble polymer.

1 Claim, 1 Drawing Sheet

GRAFT COPOLYMERS AND METHOD TO PREPARE SAME

This application claims the benefit of Provisional Application 60/391,479 filed Jun. 25, 2002.

FIELD OF THE INVENTION

Applicants' invention comprises polyoxazoline-based thermoplastic, polymeric hydrogel compositions that can be formed into useful articles by conventional molding processes, such as injection molding, compression molding, and extrusion, wherein those molded articles have the properties of a hydrogel material. Applicants' invention further comprises two methods for forming these novel thermoplastic, polymeric hydrogel compositions.

BACKGROUND OF THE INVENTION

Hydrogel-forming polymers are those which are not water soluble, but which upon contacting aqueous fluids, imbibe such fluids. Upon absorbing water, the mechanical properties of articles formed from such polymeric hydrogel materials change. For example, articles which are rigid when dry may become soft and pliable when wet.

Certain of these systems are used in commerce ranging from use as "supersorbers" in baby diapers to more sophisticated uses in the manufacture of soft contact lenses. Polymer hydrogel systems include ionically linked hydrogels, covalently crosslinked hydrogels, and the like.

Ionic hydrogels are polymers containing functional groups that ionically bond to form a crosslinked system. Such materials are used to form toy products that can be continuously reformed and reshaped. These materials, however, cannot be formed into a permanent shape or configuration.

Covalently crosslinked hydrogels are formed by crosslinking otherwise water-soluble polymers. Once these materials are crosslinked, they will no longer dissolve in water, or in any other solvent for that matter. Nevertheless, these crosslinked materials will absorb water and swell in dimension. Compositions such as crosslinked poly-2-hydroxyethylmethacrylate are used to form contact lenses. These materials, however, cannot be thermally processed.

Mechanically crosslinked systems are formed when two polymers which are incompatible are chemically linked as either block copolymers or graft copolymers. On the one hand, if the two incompatible homopolymers are simply blended together, a gross phase separation occurs. If on the other hand, the two polymers or connected together covalently, a microphase separation occurs.

This microphase separation is a well known phenomenon that has been utilized, most notably, in the styrene-butadiene Kraton triblock rubber field. Block copolymers partition into different phases, a continuous phase consisting of the higher percentage polymer and a discontinuous or dispersed phase consisting of the lower percentage polymer. The dispersed phase can form very distinct domains, including spheres, cylinders, and lamella. The configuration of these domains is related to the relative percentages of the two phases. At low percentages, the dispersed phase comprises spherical domains. As that percentage increases the dispersed phase forms cylindrical domains and finally discrete lamella.

Significantly, a microphase separated two-component polymeric material exhibits two glass transition temperatures ($t_g$'s), namely one for each polymer present. When the temperature of the composite material is below the respective glass transition temperatures of both components, the copolymer is rigid. If the composite material is warmed above the glass transition temperatures of both phases, the copolymer will flow. Therefore, such a mechanically crosslinked copolymer can be thermally processed using conventional molding techniques such as extrusion and injection molding.

A mechanically crosslinked hydrogel copolymer comprises a block or graft copolymer formed from incompatible polymers where the continuous phase is a water soluble polymer. Various water soluble organic polymers prepared from substituted ethylenes are known, including polyvinylpyrrolidone, polyvinylalcohol, and the like. Polyethylenimine, and certain of its derivatives is also water soluble.

Poly-2-alkyl-2-oxazolines, where the alkyl group comprises 1–5 carbons, are such water soluble, N-acyl polyethyleneimines. Significantly, these poly-2-alkyl-2-oxazolines have thermal properties that differ materially from water soluble polymers prepared from substituted ethylenes. For example, poly-2-ethyl-2-oxazoline has both a low dry glass transition temperature of 70–71° C. and a high thermal degradation temperature above 380° C.

Prior art mechanically crosslinked hydrogel systems do not include systems based upon poly-2-alkyl-2-oxazolines. U.S. Pat. No. 4,582,877, in the name of Fairchok et al., teaches a method to enhance the wettability of polypropylene by blending polypropylene with substituted polyethyleneimines. Fairchok et al. teaches preparation of those substituted polyethyleneimines by reacting a poly-2-oxazoline with a carboxylic acid to form a polyethyleneimine having pendent groups of up to 22 carbon atoms. Col. 1/1. 50 to Col. 2/1. 17. Each such 22 carbon pendent side group would increase the molecular weight of the polyethyleneimine by only about 300 grams/mole. In a most preferred embodiment, Fairchok et al. teaches preparation of a covalently crosslinked material by reacting a poly-2-oxazoline with a polybasic carboxylic acid. Col. 2/1. 18–25.

In contrast, Applicant's invention comprises a graft copolymer comprising a water soluble poly-2-alkyl-oxazoline having a plurality of pendent non-water soluble polymers grafted thereon, wherein each of the pendent non-water soluble polymers has a number average molecular weight of at least 5,000. Moreover, Applicants' invention does not encompass any covalently crosslinked systems.

SUMMARY OF THE INVENTION

In a first embodiment, Applicants' novel invention comprises a thermally processable graft copolymer formed from a water soluble polymer and a water insoluble polymer, wherein that graft copolymer forms a hydrogel upon exposure to water. The water soluble portion of Applicants' novel graft copolymer is formed from a poly-2-substituted-2-oxazoline. The water insoluble portion of the graft copolymer is formed from a polyalkyleneoxide polymer/copolymer, long chain alkyl, polybutadiene, polyisoprene, a polyester, a polyamide, or a polyurethane.

A second embodiment of the instant invention comprises a novel method to form such a hydrogel forming graft copolymer by copolymerizing a first 2-substituted-2-oxazolines with a second 2-substituted-2-oxazoline. Such a copolymerization can be performed neat or in solution.

A third embodiment of Applicants' invention comprises a novel method to form such a hydrogel-forming graft copolymer by transamidating a poly-2-oxazoline with a carboxylic acid terminated water-insoluble polymer. In the alternative, an amide exchange reaction is performed using a polymeric acid chloride, a polymeric acid salt, or a polymeric anhydride.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Figure 1:
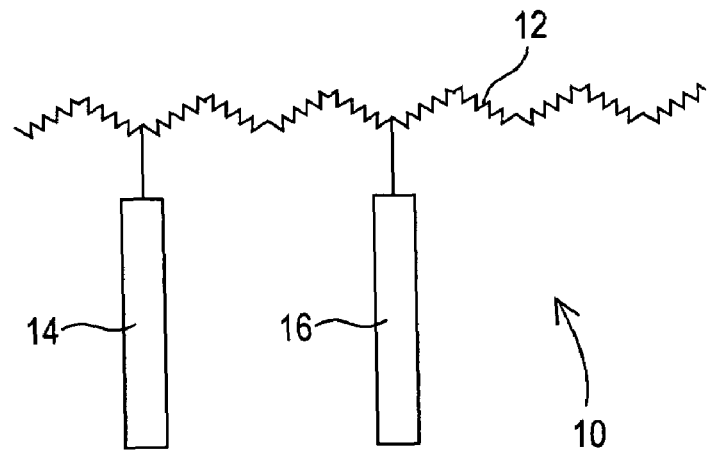
FIG. 1 is a perspective view depicting the structure of Applicants' novel graft copolymer according to the present invention.

Referring to FIG. 1, applicants' invention is shown as graft copolymer system 10, which comprises a water soluble polymer 12 having one or more pendent non-water soluble polymers 14 and 16 grafted thereon. Although FIG. 1 depicts two non-water soluble polymers, i.e. polymer 14 and polymer 16, grafted onto water soluble polymer 12, Applicants' invention includes graft copolymers in which a plurality of non-water soluble polymers are grafted onto a water soluble polymer backbone.

Figure 2:
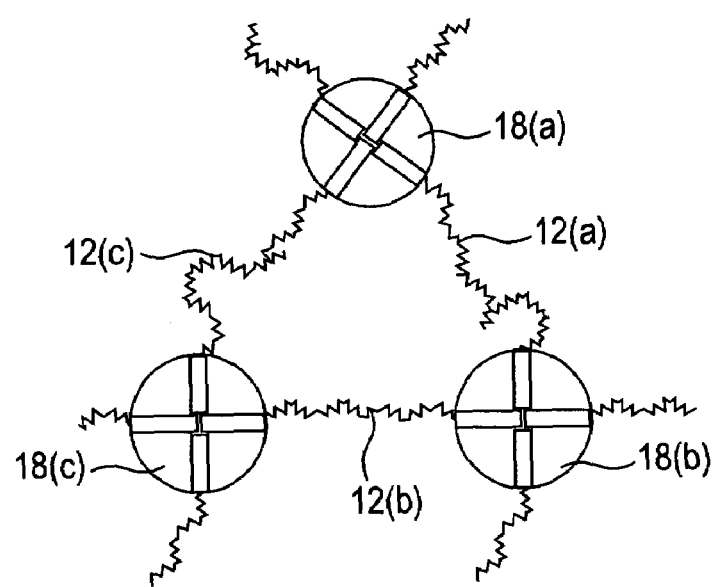
FIG. 2 is a perspective view depicting the configuration of Applicants' novel graft copolymer in an aqueous environment.

Turning to FIG. 2, the configuration of three different copolymer chains in an aqueous environment is shown. The water soluble portions of these copolymers, i.e. 12 (a), 12 (b), and 12 (c), remain individually dispersed in the solvent. The water insoluble portions, however, aggregate to form discrete domains 18(a), 18(b), and 18(c). These dispersed domains function as "mechanical" crosslinks thereby giving copolymer 12 certain physical properties generally found only in covalently crosslinked polymers. Copolymer 12, however, contains no actual covalent crosslinks, and therefore, is thermally processable.

Water soluble portion 12 of graft copolymer 12 comprises a substituted poly-N-acyl-ethyleneimine having structure I $$R'—\!\!\!\!+\!\!CH_2—CH_2—N\!\!+_n—X$$
$$\underset{R_1}{|}\!\!\!\!\!\!\overset{\phantom{|}}{\underset{\phantom{|}}{\overset{\phantom{|}}{\diagdown}O}}$$

I wherein $R_1$ is a hydrogen or an alkyl group having 1 to 4 carbons. Polymer I has a number average molecular weight of between about 5,000 to about 1,000,000, preferably between about 10,000 to about 100,000, and most preferably between about 25,000, and about 75,000. Substituted polyethyleneimine I is prepared by a cationic ring opening polymerization of 2-$R_1$-2-

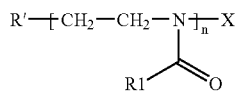

oxazoline III using catalyst IV, where R' is hydrogen, alkyl, aralkyl, and mixtures thereof, and X is acetate, p-tosylate, halide, sulfate, triflate, and mixtures thereof. For example, methyl triflate can be used as initiator IV, in which case R' is methyl and X is triflate. The cationic ring opening polymerization of monomer III can be conducted neat or in solvent. Solvents for this ring opening polymerization include orthodichlorobenzene, ethyl benzene, cumene, xylene, decane, 2-ethyl hexyl acetate, naphthalene, and octane. For example, the polymerization can be carried out in orthodichlorobenzene at a temperature between about 7° C. and about 180° C.

In a most preferred embodiment, R, is ethyl, and polymer I has a number average molecular weight of about 50,000. This poly-2-ethyl-2-oxazoline polymer is sold commercially under the name of AQUASOL 50 by Polymer Chemistry Innovations, Inc., the assignee of this application.

To form the mechanically crosslinkable polymeric hydrogel of the present invention, up to about 20% of the pendent $R_1$ groups on polymer I are replaced by a water soluble polymer to form a graft copolymer of structure II

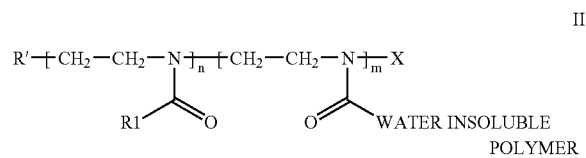

II

The WATER INSOLUBLE POLYMER portion of graft copolymer II is a non-water soluble polymeric material having a number average molecular weight between about 5,000 and 100,000, preferably between about 8,000 and about 20,000, and most preferably between about 10,000 and 15,000. The WATER INSOLUBLE POLYMER includes polyethylene, long chain alkyl, polypropylene, polybutadiene, polyisoprene, polystyrene, polymethylacrylate, polymethylmethacrylate, polyurethanes, polyamides, polyesters, polyesteramides, and copolymers of same.

In a first embodiment, graft copolymer II is formed by a transamidation reaction. In general, transamidation is accomplished by reacting an amide of one carboxylic acid with a second carboxylic acid. A mixture of amides usually results. For example, if amide V is reacted with carboxylic acid VI, transamidation occurs to yield a mixture of amides V and VII.

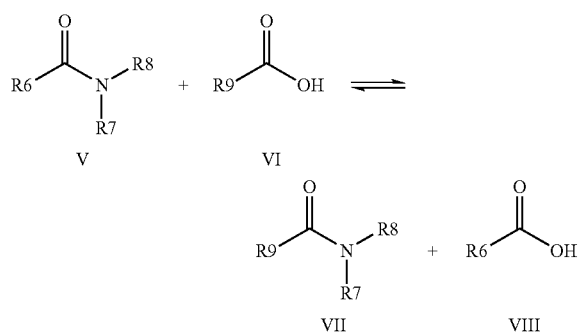

If carboxylic acid VII is removed from the reaction as it forms, however, the equilibrium will be continuously shifted to produce more amide VII. Therefore, amide V can be essentially completely converted to amide VII if acid VIII is removed as it forms.

A similar amide exchange reaction can also be performed by reacting an amide of a first carboxylic acid with a second acid salt, a second acid chloride, and/or a second acid anhydride. The transamidation reactions discussed below used to prepare graft copolymers can also use a polymeric acid salt, a polymeric acid chloride, and/or a polymeric acid anhydride.

Graft copolymer II, where the WATER INSOLUBLE PORTION comprises polystyrene, polybutadiene, polyisoprene, polymethylacrylate, polymethylmethacrylate, or copolymers of

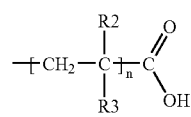

IX same, is formed by reacting polymer I with a carboxylic acid terminated polymer having structure IX. Polymer IX can be prepared by an anionically catalyzed polymerization. For example, where $R_2$ is phenyl, ethylenyl, isopropenyl, or carbomethoxy, and $R_3$ is either hydrogen or methyl, water-insoluble polymer XI can be formed by an anionic polymerization of monomer X to yield lithium-terminated living polymer XI which is reacted with carbon dioxide to give lithium carboxylate terminated polymer XII.

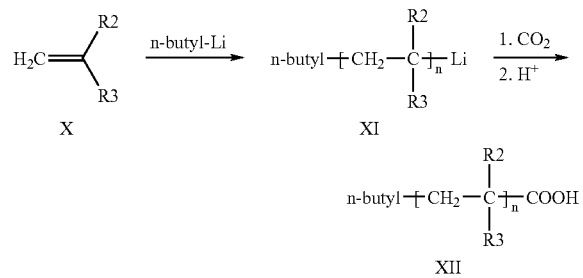

Reaction of one mole of polymer I where $R_1$ is ethyl with 0.20 moles of acid terminated polymer XII where $R_2$ is phenyl and $R_3$ is hydrogen, along with removal of the proprionic acid formed, will yield a graft copolymer having the structure XIII. Preferably, the number average

XIII

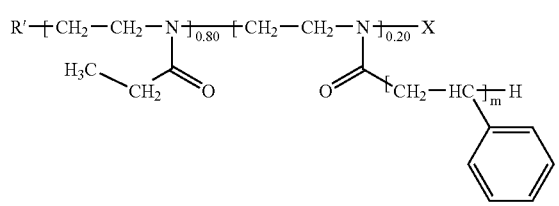

molecular weight of graft copolymer XIII is between about 1,000 and about 10,000,000 with m being between about 1 and about 10,000

Alternatively, the WATER INSOLUBLE PORTION of graft copolymer II can comprise a polyethyleneoxide, a polypropyleneoxide, or a polyethyleneoxide-co-polypropylene oxide. Such a graft copolymer is prepared by a transamidation reaction of polymer I with a carboxylic acid terminated polyalkyleneoxide polymer or copolymer.

A carboxylic acid terminated polyethylene oxide polymer can be prepared by anionic ring opening polymerization of ethylene oxide XIV to give lithium-terminated polyethylene oxide XV ($R_{10}$ is hydrogen). Lithium-terminated polyethyleneoxide XV is reacted with acrylic acid and then quenched to give acid terminated polyethylene oxide XVI.

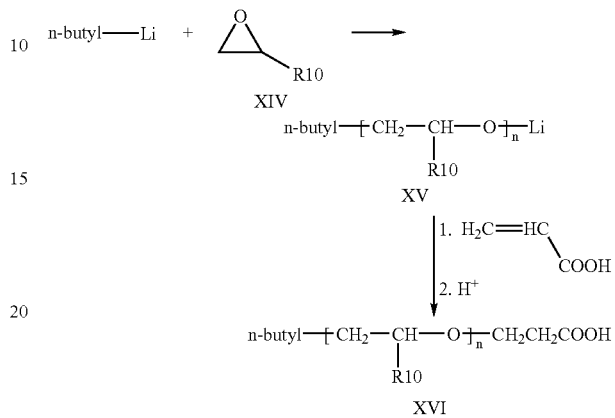

Graft copolymer II can be formed by partial transamidation of polymer I with polymer XVI. As an example, 0.20 moles of carboxylic acid terminated polyethyleneoxide XVI ($R_{10}$=H) are reacted with 1.0 moles of polymer I (R1=ethyl), with removal of the proprionic acid as it forms, to prepare graft copolymer XVII.

XVII

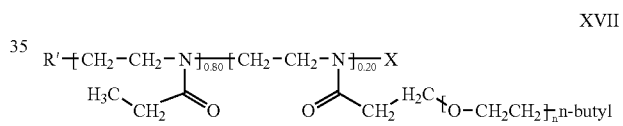

The WATER INSOLUBLE PORTION of graft copolymer II prepared by transamidation can also comprise a polyester or a polyamide. Carboxylic acid terminated polyester XXI can be prepared by reacting between about 0.1 to about 0.2 equivalents of monofunctional alcohol XVIII, 1.0 equivalents of diacid XIX, and between about 0.8 to about 0.9 equivalents of diol XX. Preferably diacid XIX comprises adipic acid, i.e. q is 4, and diol XX comprises hexahediol, i.e. r is 6.

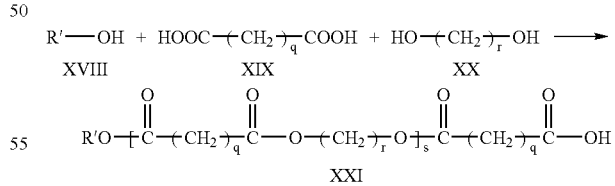

Graft copolymer II, where the WATER INSOLUBLE POLYMER comprises a polyester can be prepared by partial transamidation of polymer I with carboxylic acid terminated polyester XXI to give a graft copolymer having a number average molecular weight of between about 1,000 and about 10,000,000 with s being between about 2 and about 1,000, 000.

In a second embodiment, graft copolymer II can be prepared by copolymerization rather than by transamidation.

For example, monomer III and monomer XXII can be copolymerized to form graft copolymer II.

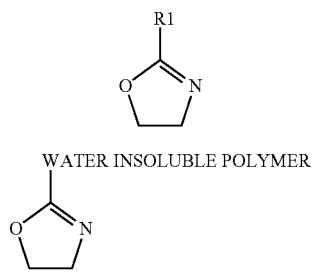

As in the transamidation embodiment discussed above, the WATER INSOLUBLE POLYMER portion of monomer XXII is selected from the group consisting of polyesters, polyamides, polyesteramides, polyurethanes, polyethyleneoxide, polypropyleneoxide, polyethyleneoxide-co-polypropyleneoxide, polybutadiene, polyisoprene, polymethylacrylate, polymethylmethacrylate, polystyrene, and copolymers of same.

Where the WATER INSOLUBLE POLYMER portion comprises polybutadiene, polyisoprene, polymethylacrylate, polymethylmethacrylate, or polystyrene, monomer XXII can be prepared by using the lithium salt of 2-methyl-2-oxazoline as an anionic polymerization initiator.

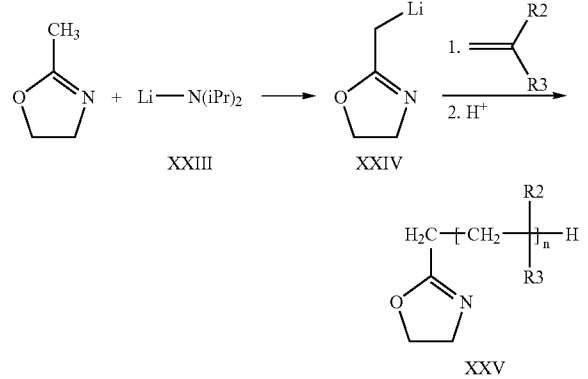

Lithium diisopropylamide XXIII can be prepared by adding a 1.5 M solution of n-BuLi in THF to diisopropylamine in THF at 0° C. After about 30 minutes that solution can be cooled to −78° C. and transferred via cannula to a precooled solution of 2-methyl-2-oxazoline in THF at −78° C. to form initiator XXIV. Initiator XXIV is added to an excess of anionically-polymerizable monomer to form a lithium-terminated polymer which after quenching with an acid yields 2-substituted-2-oxazoline XXV.

Copolymerization of 1.0 moles of monomer III where $R_1$ is ethyl with 0.20 moles of monomer XXV where $R_2$ is hydrogen and $R_3$ is phenyl yields graft copolymer XIII. This copolymerization can be performed neat or in solvent.

As those skilled in the art will appreciate, a carboxylic acid terminated polyamide can be similarly formed from a condensation reaction of about 0.1 to about 0.2 equivalents of a monoamine, 1.0 equivalents of a diacid, and about 0.8 to about 0.9 equivalents of a diamine, with continuous removal of the water formed. Moreover, reaction of about 0.1 equivalents of a monoamine, 1.0 equivalents of a diacid, and about 0.8 to about 0.9 equivalents of a mixture of a diol and diamine, will form a carboxylic acid terminated polyesteramide.

In order to prepare graft copolymer II where the WATER INSOLUBLE POLYMER comprises a polyalkyleneoxide polymer or copolymer, initiator XXIV can be used to anionically polymerize ethylene oxide (XIV with $R_{10}$=H) and/or propylene oxide (XIV with $R_{10}$=methyl) to form 2-polyethylene oxide-2-oxazoline XXIX ($R_{10}$=H), 2-polypropylene oxide-2-oxazoline XXIX ($R_{10}$=methyl), or 2-polyethyleneoxide-co-polypropyleneoxide-2-oxazoline XXX. As those skilled in the art will appreciate, 2-oxazoline-terminated copolymer XXX may comprise a random copolymer of ethylene oxide units and propylene oxide units, or a block copolymer of alternating ethylene oxide blocks and propylene oxide blocks.

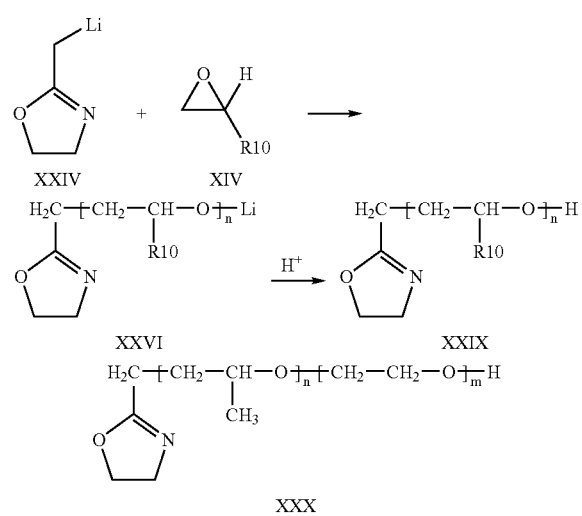

Monomer XXIX can be copolymerized with monomer III to form graft copolymer II. The cationic ring-opening copolymerization can be carried out neat or in solvent. For example, copolymerizing 1.0 moles of monomer III, where $R_1$ is ethyl, with 0.20 moles of monomer XXIX, where $R_{10}$ is hydrogen, forms graft copolymer XXXI.

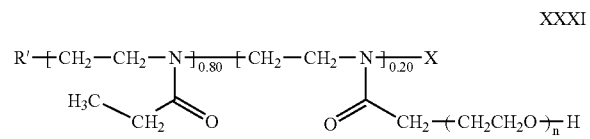

Alternatively, copolymerization of monomer XXXIII with monomer III gives a graft copolymer where the WATER INSOLUBLE POLYMER portion comprises a polyester. Carboxylic acid terminated polyester XXI is reacted with ethanolamine to form beta-, hydroxyamide terminated polyester XXXII which is subsequently cyclized with removal of one mole of water to form monomer XXXIII.

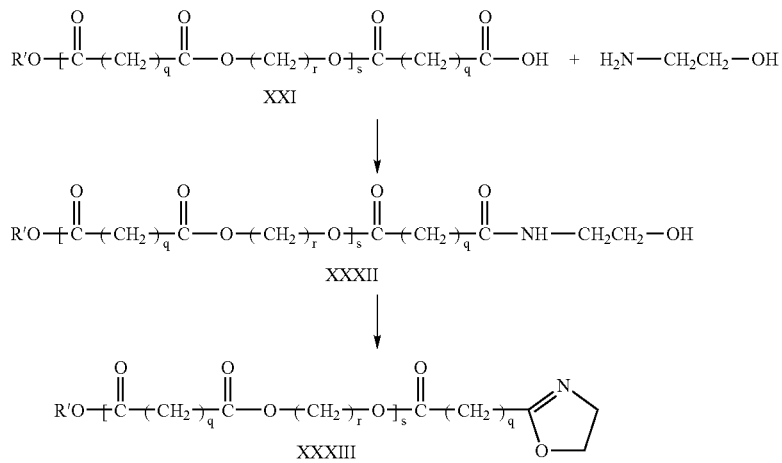

Preferably, the graft copolymer formed by the cationic ring-opening copolymerizing monomer III where $R_1$ is ethyl, and monomer XXXIII, where q is 4 and r is 6, has a number average molecular weight between about 100 and about 10,000,000 with s being between about 2 and about 1,000,000.

While the preferred embodiments of the present invention have been illustrated in detail, it should be apparent that modifications and adaptations to those embodiments may occur to one skilled in the art without departing from the scope of the present invention as set forth in the following claims.

We claim:

1. A polymeric material having the structure

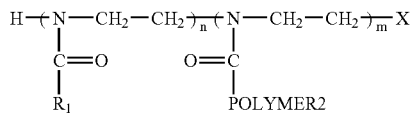

wherein $R_1$ is selected from the group consisting of hydrogen, methyl, ethyl, and propyl, X is selected from the group consisting of acetate, p-tosylate, halide, sulfate, triflate, and mixtures thereof, and POLYMER2 is a water-insoluble polymeric material having a number average molecular weight in excess of 5,000, wherein POLYMER2 has the structure

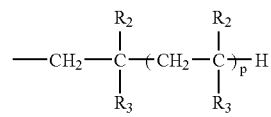

wherein $R_2$ is selected from the group consisting of hydrogen, methyl, and mixtures thereof, and $R_3$ is selected from the group consisting of hydrogen, methyl, ethenyl, isopropenyl, carbomethoxy, phenyl, and mixtures thereof, wherein n is between about 50 to about 10,000, m is adjusted such that m/(n+m) is between about 0.0001 to about 0.20, and p is between about 60 to about 1250.

* * * * *